US012131687B2

(12) United States Patent
Cai et al.

(10) Patent No.: US 12,131,687 B2
(45) Date of Patent: Oct. 29, 2024

(54) MINI LED DRIVING POWER SUPPLY AND MINI LED TELEVISION

(71) Applicant: SHENZHEN SKYWORTH-RGB ELECTRONIC CO., LTD, Guangdong (CN)

(72) Inventors: Shengping Cai, Shenzhen (CN); Jianhua Zhou, Shenzhen (CN); Zantian Chen, Shenzhen (CN); Hao Wei, Shenzhen (CN); Xuan Yuan, Shenzhen (CN)

(73) Assignee: SHENZHEN SKYWORTH-RGB ELECTRONIC CO., LTD, Guangdong (CN)

( * ) Notice: Subject to any disclaimer, the term of this patent is extended or adjusted under 35 U.S.C. 154(b) by 15 days.

(21) Appl. No.: 18/044,447

(22) PCT Filed: Dec. 30, 2021

(86) PCT No.: PCT/CN2021/143153
§ 371 (c)(1),
(2) Date: Mar. 8, 2023

(87) PCT Pub. No.: WO2023/005146
PCT Pub. Date: Feb. 2, 2023

(65) Prior Publication Data

US 2023/0343273 A1 Oct. 26, 2023

(30) Foreign Application Priority Data

Jul. 28, 2021 (CN) ........................ 202110855542.7

(51) Int. Cl.
*G09G 3/32* (2016.01)
*H05B 45/355* (2020.01)

(52) U.S. Cl.
CPC ............ *G09G 3/32* (2013.01); *H05B 45/355* (2020.01); *G09G 2310/0237* (2013.01); *G09G 2330/028* (2013.01)

(58) Field of Classification Search
CPC .... G09G 3/32; G09G 2310/0237; G09G 3/20; G09G 2330/021; G09G 3/3406; G09G 3/3413; H05B 45/355; H05B 45/39
See application file for complete search history.

(56) References Cited

U.S. PATENT DOCUMENTS

| | | | | |
|---|---|---|---|---|
| 11,308,871 | B2 * | 4/2022 | Cai | H05B 45/39 |
| 2012/0195080 | A1 | 8/2012 | Smith et al. | |

(Continued)

FOREIGN PATENT DOCUMENTS

| | | | |
|---|---|---|---|
| CN | 106409220 | A | 2/2017 |
| CN | 109119021 | A | 1/2019 |

(Continued)

OTHER PUBLICATIONS

International Search Report issued on Apr. 14, 2022, in corresponding application No. PCT/CN2021/143153; 8 pgs.

(Continued)

*Primary Examiner* — Temesghen Ghebretinsae
*Assistant Examiner* — Sosina Abebe
(74) *Attorney, Agent, or Firm* — Samson G. Yu

(57) ABSTRACT

A MINI LED driving power supply and a MINI LED television, the MINI LED driving power supply includes a power supply board connecting with a mainboard and a MINI LED screen, the power supply board includes a first conversion module and a second conversion module; the first conversion module outputs power supply voltage to power the mainboard after the first conversion module is turned on, outputs first voltage and second voltage to power the mainboard according to a power-on/off signal output by (Continued)

the mainboard, and outputs first power supply and high-voltage direct current to the second conversion module; the second conversion module converts high-voltage direct current into third voltage and outputs the third voltage to the MINI LED screen according to enable signal output by the mainboard and the first power supply, to light up MINI LED screen.

11 Claims, 5 Drawing Sheets

(56) References Cited

U.S. PATENT DOCUMENTS

| | | | | |
|---|---|---|---|---|
| 2017/0006688 | A1* | 1/2017 | Dai | H02M 1/42 |
| 2017/0231041 | A1* | 8/2017 | Yang | H05B 45/10 |
| 2020/0321854 | A1* | 10/2020 | Joo | H02M 1/4208 |
| 2020/0328671 | A1* | 10/2020 | Li | H02M 3/33569 |
| 2020/0382740 | A1 | 12/2020 | Zhou et al. | |

FOREIGN PATENT DOCUMENTS

| | | | |
|---|---|---|---|
| CN | 109166519 | A | 1/2019 |
| CN | 109637461 | A | 4/2019 |
| CN | 110880294 | A | 3/2020 |
| CN | 111818284 | A | 10/2020 |
| CN | 112349249 | A | 2/2021 |
| CN | 112350279 | A | 2/2021 |
| CN | 113035138 | A | 6/2021 |
| CN | 113593486 | A | 11/2021 |
| TW | 202118090 | A | 5/2021 |

OTHER PUBLICATIONS

Chinese Office Action and Search Report issued on Apr. 27, 2022 in corresponding application No. 202110855542.7; 16 pgs.

* cited by examiner

MINI LED DRIVING POWER SUPPLY AND MINI LED TELEVISION

CROSS-REFERENCES TO RELATED APPLICATIONS

This application is the national stage of PCT international application No. PCT/CN2021/143153, filed on Dec. 30, 2021, which claims priority to Chinese Patent Application No. 202110855542.7, filed on Jul. 28, 2021, the content of all of which is incorporated herein by reference.

FIELD

The present application generally relates to the technical field of power supply, and more particularly, to a MINI LED driving power supply and a MINI LED television.

BACKGROUND

Most liquid crystal televisions adopts LED (Light Emitting Diode) as backlight source, while a Mini-LED television adopts a light source smaller than conventional LED in volume. A width of a Mini-LED is about 200 microns, which is one fifth of a size of a standard LED used in an LCD panel. Since a volume of Mini-LED is small enough, it is possible to arrange more Mini-LEDs on an entire screen. When a screen has enough number of LED backlight, it will be possible to better control a bright and dark, a color gradation and more of a picture, so as to provide a better image quality.

In order to provide a high quality image, in a design of the power supply of Mini-LED television, the power supply has a higher requirement on a ripple of output voltage, and a precision of the output voltage.

According to a size difference of the screen and a power consumption difference of a whole machine, various power solutions are adopted, having a conventional output of +12V and +28V. Conformation and output of a +12V voltage and a +28V voltage on a traditional power supply board share one transformer, shown as FIG. 1 and FIG. 2. During a high power output, the +12V voltage and the +28V voltage will definitely affect each other and generate an unpredictable result, making a period of research, development, and debugging extend.

Therefore, the existing technology needs to be improved and developed.

SUMMARY

According to the defects listed above in the prior art, the objective of the present application is to provide a MINI LED driving power supply and a MINI LED television, which are able to solve a problem in the prior art of different voltages affecting each other during a high power output.

In order to achieve the object described above, the technical solution of the present application is as follows:

a MINI LED driving power supply, which comprises a power supply board connecting with a mainboard and a MINI LED screen, the power supply board comprises a first conversion module and a second conversion module;

the first conversion module is connected to the mainboard and the second conversion module, applied to outputting a power supply voltage to power the mainboard after the first conversion module is powered on, and outputting a first voltage and a second voltage to power the mainboard according to a power-on/off signal output by the mainboard, as well as outputting a first power supply and a high-voltage direct current to the second conversion module;

the second conversion module is connected to the MINI LED screen, applied to converting the high-voltage direct current into a third voltage and outputting the third voltage to the MINI LED screen according to an enable signal output by the mainboard and the first power supply, to light up the MINI LED screen.

In the MINI LED driving power supply, the first conversion module comprises a standby control unit and a first conversion unit;

the first conversion unit is connected to the mainboard, applied to outputting the power supply voltage to power the mainboard after the first conversion unit is powered on;

the standby control unit is connected to the mainboard and the first conversion unit respectively, applied to controlling the first conversion unit to start according to the power-on/off signal output by the mainboard;

the first conversion unit is further applied to outputting the first voltage and the second voltage to power the mainboard after the first conversion unit is started, and outputting the high-voltage direct current and the first power supply to the second conversion module.

In the MINI LED driving power supply, the second conversion module comprises an enabling switching unit and a second conversion unit;

the enabling switching unit is connected to the first converting unit and the second converting unit, respectively, applied to converting the first power supply into a second power supply and outputting the second power supply to the second conversion unit according to the enable signal output by the mainboard;

the second conversion unit is connected to the MINI LED screen, applied to converting the high-voltage direct current into the third voltage to power the MINI LED screen according to the second power supply.

In the MINI LED driving power supply, the standby control unit comprises a standby switching subunit and a step-down subunit;

the standby switching subunit is connected to the mainboard and the first conversion unit, respectively, applied to controlling the first conversion unit to start according to the power-on/off signal output by the mainboard;

the step-down subunit is connected to the mainboard and the first conversion unit respectively, applied to providing a feedback signal for the first conversion unit according to the power-on/off signal.

In the MINI LED driving power supply, the first conversion unit comprises a conversion subunit and a power supply subunit;

the conversion subunit is connected to the power supply subunit and the mainboard, respectively, applied to outputting the power supply voltage to power the mainboard after the conversion subunit is powered on, outputting the first voltage and the second voltage to power the mainboard after the conversion subunit is started, and outputting the high-voltage direct current to the second conversion unit;

the power supply subunit is applied to outputting the first power supply to the enabling switching unit according to a control signal output by the conversion subunit.

In the MINI LED driving power supply, the second conversion unit comprises a main LLC circuit and a main LLC transformer;

the main LLC circuit is connected to the enabling switching unit and the main LLC transformer, respectively, applied to starting the main LLC transformer according to the second power supply;

the main LLC transformer is connected to the MINI LED screen, applied to converting the high-voltage direct current into the third voltage and outputting the third voltage to the MINI LED screen.

In the MINI LED driving power supply, the enabling switching unit comprises a first diode, a second diode, a first resistor, a second resistor, a third resistor, a fourth resistor, a fifth resistor, a sixth resistor, a first triode, a second triode, a first capacitor, a second capacitor, a first Zener diode, and a first optocoupler;

an anode of the first diode is connected to an enable signal input terminal, an anode of the second diode is connected to an LED_ON signal terminal, both a cathode of the first diode and a cathode of the second diode are connected to one end of the first resistor; another end of the first resistor, one end of the second resistor, and one end of the first capacitor are all connected to a base of the first triode; an emitter of the first triode, another end of the first capacitor, and another end of the second resistor are all grounded; a collector of the first triode is connected to a second pin of the first optocoupler, a first pin of the first optocoupler is connected to a first voltage input terminal through the third resistor, a third pin of the first optocoupler is connected to one end of the fourth resistor, another end of the fourth resistor is connected to one end of the fifth resistor, a base of the second triode, and a cathode of the first Zener diode; an anode of the first Zener diode and another end of the fifth resistor are grounded, the emitter of the first triode, one end of the second capacitor, and one end of the sixth resistor are all connected to an output terminal of the second power supply, another end of the second capacitor is grounded, a collector of the second triode, a fourth pin of the first optocoupler, and another end of the sixth resistor are all connect to an input terminal of the first power supply.

In the MINI LED driving power supply, the standby switching subunit comprises a third diode, a seventh resistor, an eighth resistor, a ninth resistor, a tenth resistor, a third triode, a third capacitor, and a second optocoupler;

an anode of the third diode is connected to the mainboard, a cathode of the third diode is connected to one end of the seventh resistor, another end of the seventh resistor, one end of the eighth resistor, and one end of the third capacitor are all connected to a base of the third triode, an emitter of the third triode, another end of the third capacitor, and another end of the eighth resistor are all grounded; a collector of the third triode is connected to a second pin of the second optocoupler, a first pin of the second optocoupler is connected to the first voltage input terminal through the ninth resistor, a third pin of the second optocoupler is connected to an Auto_stb signal terminal, and a fourth pin of the second optocoupler is connected to a DVCC_1 signal terminal.

In the MINI LED driving power supply, the step-down subunit comprises a fourth diode, an eleventh resistor, a twelfth resistor, a fourth capacitor, a fourth triode, a thirteenth resistor, a fourteenth resistor, a fifteenth resistor, a sixteenth resistor, a seventeenth resistor, an eighteenth resistor, a nineteenth resistor, a twentieth resistor, a twenty-first resistor, a twenty-second resistor, a twenty-third resistor, a fifth capacitor, a sixth capacitor, a seventh capacitor, an eighth capacitor, a ninth capacitor, a voltage regulator, a third optocoupler, and a second Zener diode;

An anode of the fourth diode is connected to the mainboard, a cathode of the fourth diode is connected to one end of the eleventh resistor, another end of the eleventh resistor, one end of the twelfth resistor, and one end of the fourth capacitor are all connected to a base of the fourth triode, an emitter of the fourth triode, another end of the fourth capacitor, and another end of the twelfth resistor are all grounded, a collector of the fourth triode is connected to one end of the thirteenth resistor, another end of the thirteenth resistor is connected to one end of the fourteenth resistor, another end of the fourteenth resistor is connected to one end of the fifteenth resistor, one end of the seventh capacitor, one end of the sixth capacitor, one end of the fifth capacitor, and one end of the eighteenth resistor; one end of the seventeenth resistor, one end of the eighth capacitor and one end of the twentieth resistor are all connected to one end of the fifth capacitor, a first pin of the voltage regulator is connected to one end of the eighteenth resistor, another end of the sixth capacitor is connected to one end of the twenty-second resistor, another end of the twenty-second resistor, one end of the twenty-third resistor, one end of the ninth capacitor, another end of the seventh capacitor, and a second pin of the voltage regulator are all connected to a second pin of the third photocoupler, another end of the fifth capacitor is connected to one end of the sixteenth resistor, another end of the sixteenth resistor and another end of the seventeenth resistor are both connected to power, another end of the eighth capacitor is connected to one end of the nineteenth resistor, another end of the nineteenth resistor, another end of the twentieth resistor, and one end of the twenty-first resistor are all connected to power, another end of the twenty-first resistor, one end of the twenty-third resistor, and a first pin of the third optocoupler are all connected to an OVP_1 signal terminal, another end of the fifteenth resistor, another end of the eighteenth resistor, another end of the ninth capacitor, and a third pin of the voltage regulator are all grounded, a third pin of the third photocoupler and an anode of the second Zener diode are both grounded, a fourth pin of the third photocoupler and a cathode of the second Zener diode are connected to an FB_2 signal terminal.

A MINI LED television is provided, which comprises the MINI LED driving power supply stated above.

Compared with the prior art, the present application provides a MINI LED driving power supply and a MINI LED television, the MINI LED driving power supply comprises a power supply board connecting with a mainboard and a MINI LED screen, the power supply board comprises a first conversion module and a second conversion module; the first conversion module connects to the mainboard and the second conversion module, applied to outputting a power supply voltage to power the mainboard after first conversion module is turned on, and outputting a first voltage and a second voltage to power the mainboard according to a power-on/off signal output by the mainboard, as well as outputting a first power supply and a high-voltage direct current to the second conversion module; the second conversion module connects to the MINI LED screen, applied to converting the high-voltage direct current into a third voltage before outputting to the MINI LED screen according to an enable signal output by the mainboard and the first power supply, to light up the MINI LED screen. By converting and outputting the first voltage and the third voltage independently, the present application makes that, whether an output of the third voltage works normally or not will has no affect on a working state of another line, thus a problem of an interference between a plurality of lines is avoided.

DETAILED DESCRIPTION

The present application provides a MINI LED driving power supply and a MINI LED television, being able to solve a problem of different voltages affect each other during a high power output.

To make the objectives, technical schemes and results more explicit, further description will be made in detail to illustrate the present application. It should be understood that the specific embodiments described herein are used to explain the present application only, instead of limiting the scope of the present application.

In addition to being used in a field of the MINI LED television, the MINI LED driving power provided by the present application can further be applied to a plurality of display-related power drivings including an OLED monitor, an LED monitor, an audio-visual education, and a rear-projection plasma.

Figure 1:
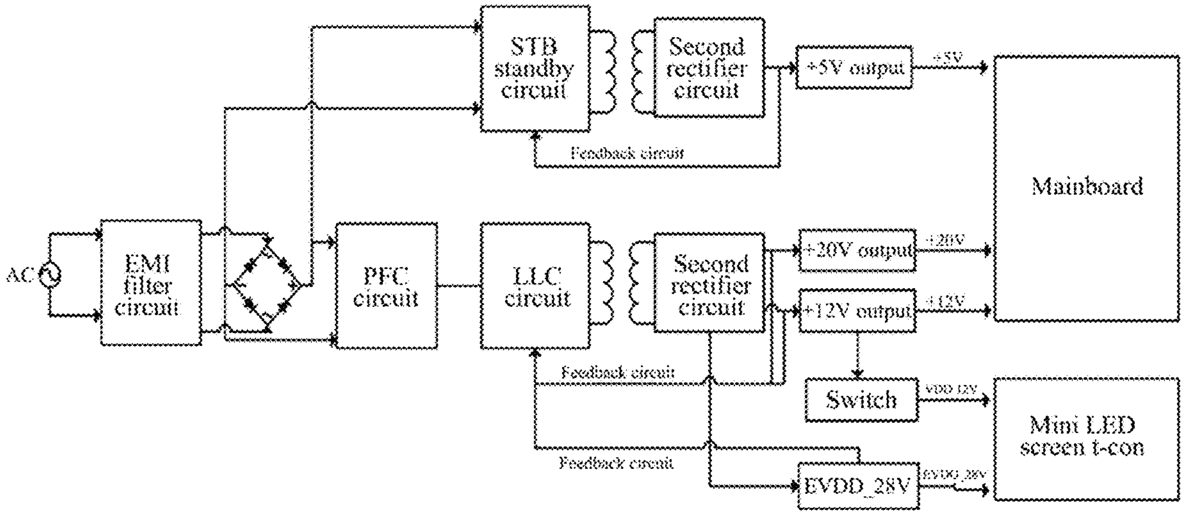
FIG. 1 and FIG. 2 illustrate a structural schematic diagram on a driving power supply in the prior art.
Figure 2:
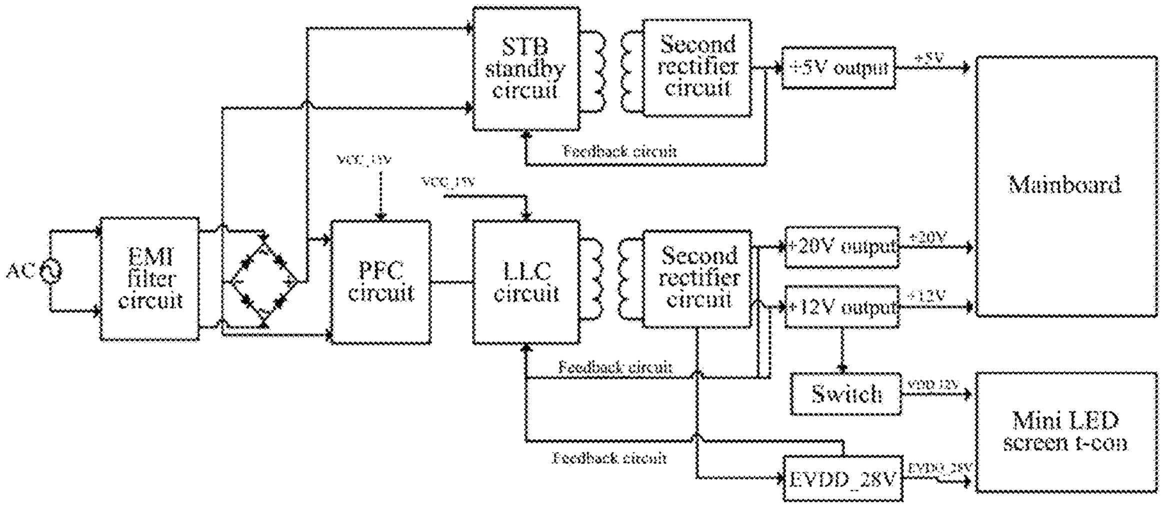
Figure 3:
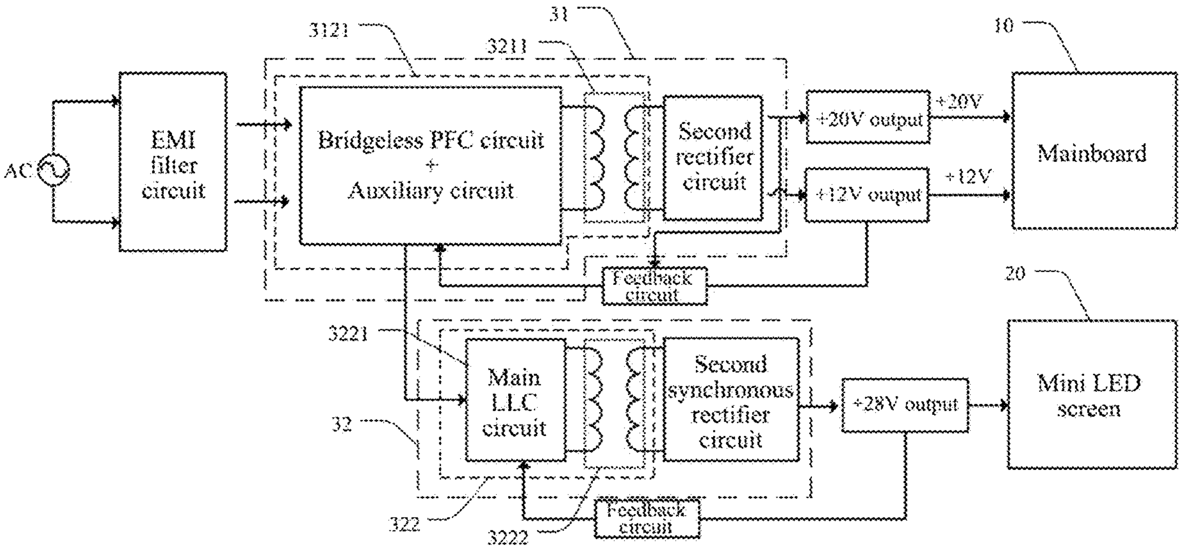
FIG. 3 illustrates a structural schematic diagram on a MINI LED driving power supply provided by the present application.

Referring to FIG. 3, the present application provides a MIN LED driving power supply, which comprises a power supply board connecting with a mainboard 10 and a MINI LED screen 20, the power supply board comprises a first conversion module 31 and a second conversion module 32; the first conversion module 31 connects to the mainboard 10 and the second conversion module 32, applied to outputting a power supply voltage to power the mainboard 10 after the first conversion module 31 is powered on, and outputting a first voltage (+12V in the present embodiment) and a second voltage (+20V in the present embodiment) to power the mainboard 10 according to a power-on/off signal (ON_OFF in the present embodiment) output by the mainboard 10, as well as outputting a first power supply and a high-voltage direct current to the second conversion module 32; the second conversion module 32 connects to the MINI LED screen, applied to converting the high-voltage direct current into a third voltage (+28V in the present embodiment) before outputting to the MINI LED screen 20 according to an enable signal output by the mainboard 10 and the first power supply, to light up the MINI LED screen 20. The present application, by converting and outputting the first voltage and the third voltage independently, and providing the third voltage to power the screen independently, makes that, whether an output of the third voltage works normally or not will not affect a working state of another line, thus a problem of an interference between a plurality of lines is avoided.

Further, the first conversion module 31 comprises a standby control unit (not shown in the FIGs) and a first conversion unit (not shown in the drawings), the first conversion unit connects to the mainboard 10, applied to outputting the power supply voltage (10V in the present embodiment) to power the mainboard 10 after the first conversion unit is powered on, the standby control unit connects to the mainboard 10 and the first conversion unit respectively, applied to controlling the first conversion unit to start according to the power-on/off signal output by the mainboard 10; the first conversion unit is further applied to outputting the first voltage and the second voltage to power the mainboard 10 after the first conversion unit is started, and outputting the high-voltage direct current and the first power supply to the second conversion module 32. Specifically, after connecting to an AC power, the power supply board outputs 10V to power the mainboard 10, and the mainboard 10 sends a power-on/off signal to the power supply board after working normally, making the power supply board output the first voltage to power the main board 10. After the mainboard 10 works steadily, it facilitates to control a follow-up work of the second conversion module 32, making the second conversion module 32 output the third voltage to the MINI LED screen 20, and further control the MINI LED screen 20 light up.

Figure 4:
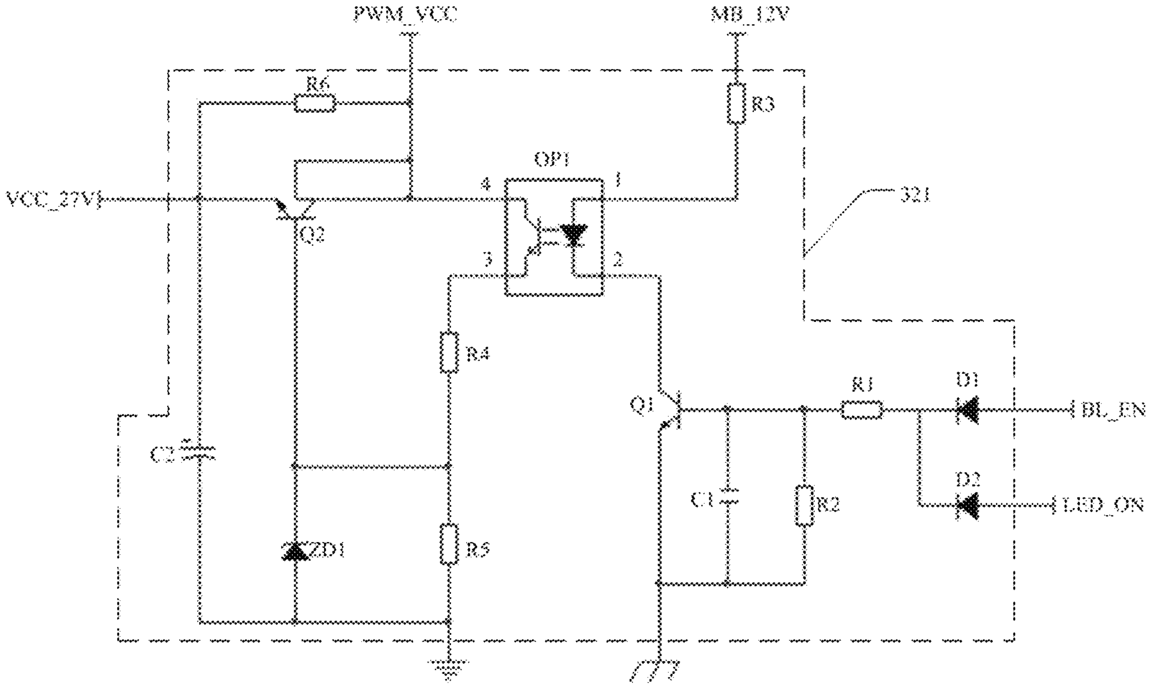
FIG. 4 illustrates a circuit diagram on an enabling switching unit in the MINI LED driving power supply provided by the present application.

Further, referencing to FIG. 4 together, the second conversion module 32 comprises an enabling switching unit 321 and a second conversion unit 322; the enabling switching unit 321 connects to the first converting unit and the second converting unit 322 respectively, applied to converting the first power supply (PWM_VCC in the present embodiment) into a second power supply (VCC_27V in the present embodiment) before outputting to the second conversion unit 322 according to the enable signal output by the mainboard 10; the second conversion unit 322 connects to the MINI LED screen 20, applied to converting the high-voltage direct current into the third voltage to power the MINI LED screen 20 according to the second power supply, further achieving lighting up the MINI LED screen 20. In the present embodiment, the voltage outputs of the first conversion module 31 and the second conversion module 32 are independent of each other, and a voltage output of one line will not interfere with a voltage output of another line, thereby a problem of an interference between lines is avoided effectively. Due to an output of each line is separated completely, when a load of one line changes, there is no affect on an output of another line, which ensures a normal and stable operation of a system. The output voltages of the power supply board are independent, making a whole machine work stably and normally, which is able to improve an electric performance of a product, improve a picture quality experience of the MINI LED television and prolong a service life of the screen.

Figure 5:
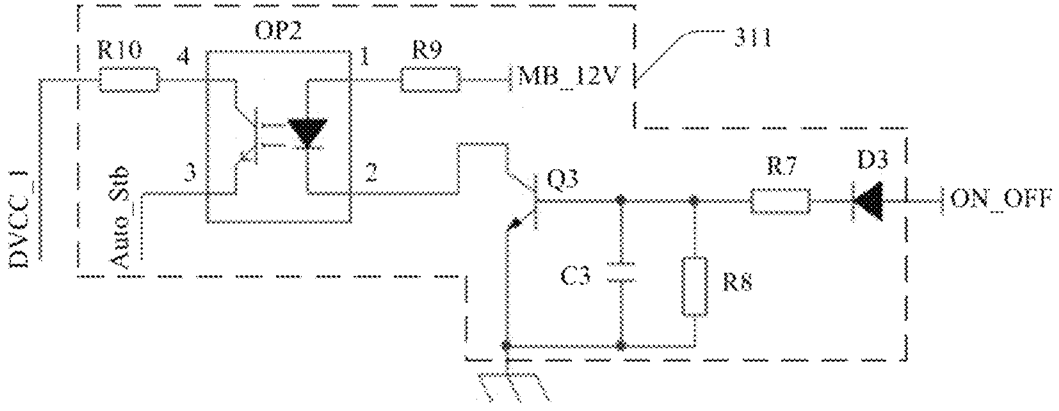
FIG. 5 illustrates a circuit diagram on a standby switching subunit in the MINI LED driving power supply provided by the present application.
Figure 6:
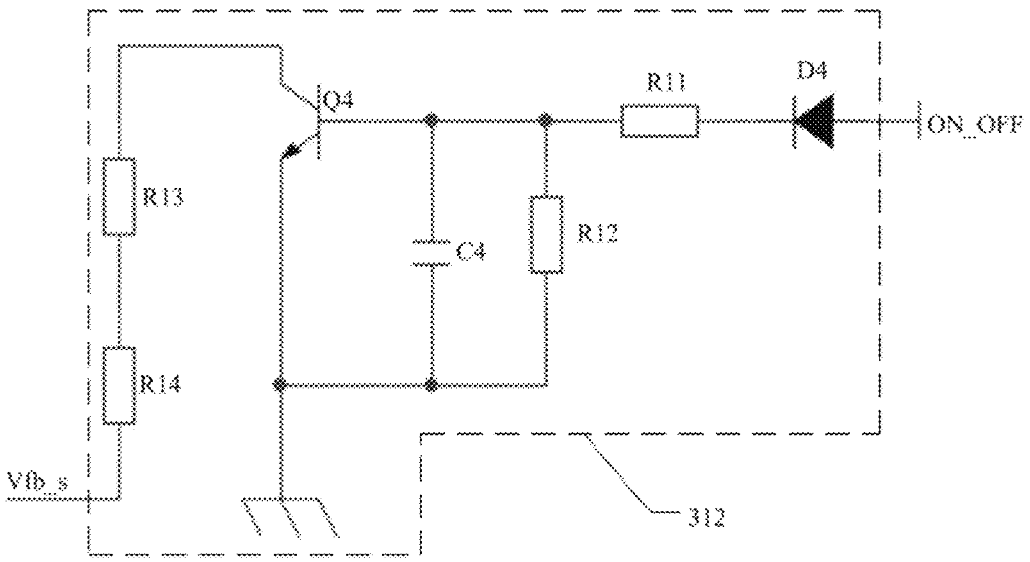
FIG. 6 and FIG. 7 illustrate a circuit diagram on a step-down subunit in the MINI LED driving power supply provided by the present application.
Figure 7:
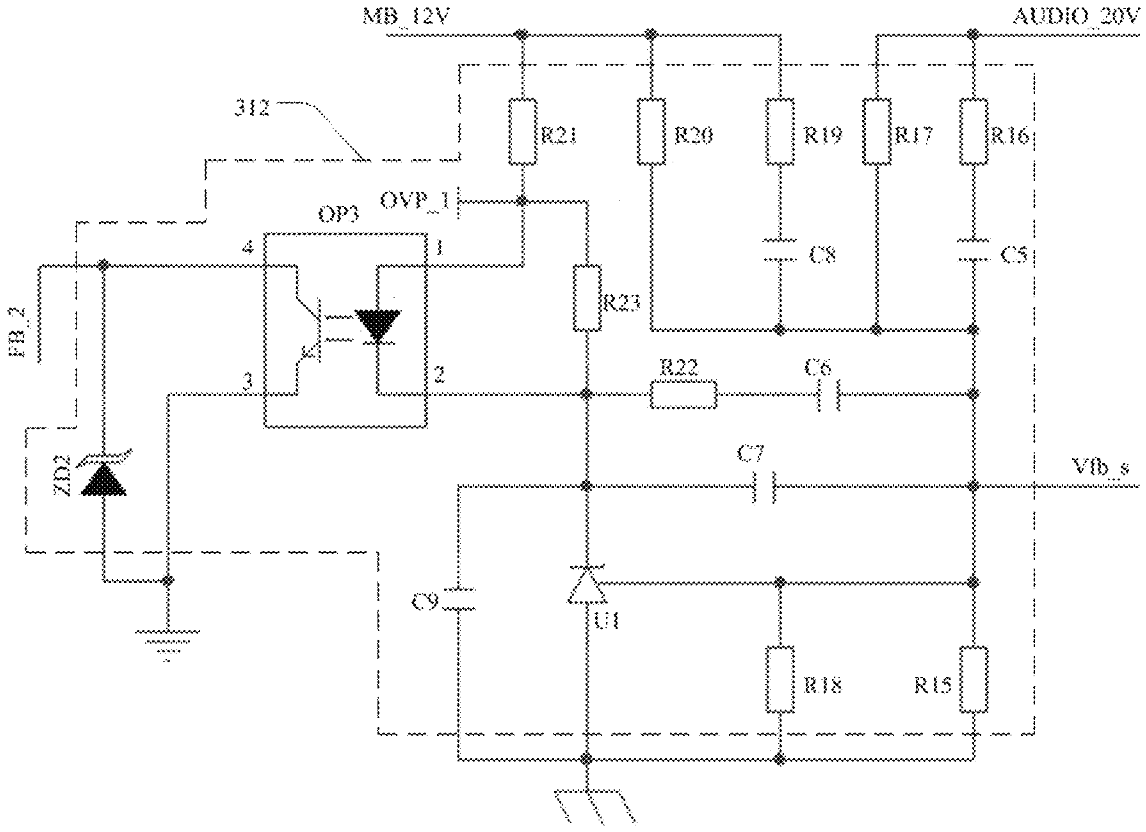

Further, referring to FIG. 5, FIG. 6, and FIG. 7 together, the standby control unit comprises a standby switching subunit 311 and a step-down subunit 312; the standby switching subunit 311 connects to the mainboard 10 and the first conversion unit respectively, applied to controlling the first conversion unit to start according to a power-on/off signal output by the mainboard 10; the step-down subunit 312 connects to the mainboard 10 and the first conversion unit respectively, applied to providing a feedback signal for the first conversion unit according to the power-on/off signal. After receiving a power-on/off signal in a high level, the standby switching subunit 311 exits a standby mode and wakes up the first conversion unit, making the first conversion unit exit the standby mode and enter a working mode. At a same time, the step-down subunit 312 also provides a feedback signal to the first conversion unit according to the power-on/off signal in the high level, making the first conversion unit work normally and output the first voltage and the second voltage to power the mainboard 10, thereby ensuring a stable operation of the mainboard 10.

Figure 8:
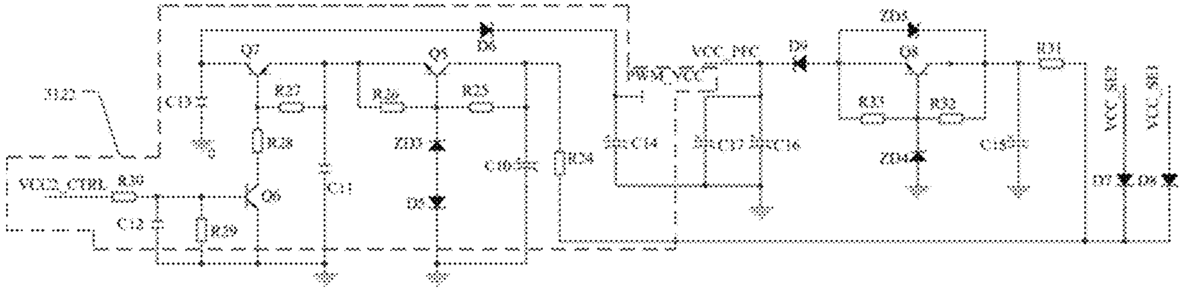
FIG. 8 illustrates a circuit diagram on a power supply subunit in the MINI LED driving power supply provided by the present application.

Further, referring to FIG. 8, the first conversion unit comprises a conversion subunit 3121 and a power supply subunit 3122; the conversion subunit 3121 connects to the power supply subunit 3122 and the mainboard 10 respectively, applied to outputting the power supply voltage to power the mainboard 10 after the conversion subunit 3121 is powered on, and outputting the first voltage and the second voltage to power the mainboard 10 after the conversion subunit 3121 is started, as well as outputting the high-voltage direct current to the second conversion unit 322; the power supply subunit 3122 is applied to outputting the first power supply to the enabling switching unit 321 according to a control signal output by the conversion subunit 3121, further powering the enabling switching unit 321, and ensuring the enabling switching unit 321 to be able to power the second conversion unit 322 to work.

Further, continue referring to FIG. 3, the second conversion unit 322 comprises a main LLC circuit 3221 and a main LLC transformer 3222; the main LLC circuit 3221 connects with the enabling switching unit 321 and the main LLC transformer 3222 respectively, applied to starting the main LLC transformer 3222 according to the second power supply; the main LLC transformer 3222 connects to the MINI LED screen 20, applied to converting the high-voltage direct current into the third voltage before outputting to the MINI LED screen 20. The main LLC circuit 3221 starts the main LLC transformer 3222 after receiving the second power supply output from the enabling switching unit 321, then the main LLC transformer 3222 converts the high-voltage direct current before outputting the third voltage to the MINI LED screen 20, to light up the MINI LED screen 20, so as to complete a driving process of the MINI LED screen 20.

Further, the conversion subunit 3121 comprises a bridgeless PFC circuit, an auxiliary LLC circuit, and an auxiliary LLC transformer 3211 integrated in a same semiconductor chip package, wherein a type of a chip having the bridgeless PFC circuit and an LLC controller integrated is U_MD6751, the bridgeless PFC circuit outputs a high-voltage direct current to the auxiliary LLC circuit after the bridgeless PFC circuit is started, and after the auxiliary LLC circuit controls the LLC transformer to start, the auxiliary LLC transformer 3211 converts the high-voltage direct current into the first voltage and the second voltage to supply power to the mainboard 10; wherein, the bridgeless PFC circuit further outputs the high-voltage direct current to the second conversion module 32, so that the main LLC transformer 3222 in the second conversion module 32 outputs the third voltage to power the MINI LED screen 20, thus a structure of the MINI LED driving power supply in the present application adopts an independent conversion circuit, and adopts different transformers to output different voltages, thereby reducing a mutual interference between outputs.

Further, referring to FIG. 4, the enabling switching unit 321 comprises a first diode D1, a second diode D2, a first resistor R1, a second resistor R2, a third resistor R3, a fourth resistor R4, a fifth resistor R5, a sixth resistor R6, a first triode Q1, a second triode Q2, a first capacitor C1, a second capacitor C2, a first Zener diode ZD1, and a first optocoupler OP1; an anode of the first diode D1 connects to an enable signal input terminal, an anode of the second diode D2 connects to an LED_ON signal terminal, both a cathode of the first diode D1 and a cathode of the second diode D2 connect to one end of the first resistor R1, another end of the first resistor R1, one end of the second resistor R2, and one end of the first capacitor C1 all connect to a base of the first triode Q1, an emitter of the first triode Q1, another end of the first capacitor C1, and another end of the second resistor R2 are all grounded, and a collector of the first triode Q1 connects to a second pin of the first optocoupler OP1, a first pin of the first optocoupler OP1 connects to a first voltage input terminal through the third resistor R3, a third pin of the first optocoupler OP1 connects to one end of the fourth resistor R4, another end of the fourth resistor R4 connects to one end of the fifth resistor R5, a base of the second triode Q2, and a cathode of the first Zener diode ZD1, an anode of the first Zener diode ZD1 and another end of the fifth resistor R5 are grounded, the emitter of the first triode Q1, one end of the second capacitor C2, and one end of the sixth resistor R6 are all connected to an output terminal of the second power supply, another end of the second capacitor C2 is grounded, all of a collector of the second triode Q2, a fourth pin of the first optocoupler OP1, and another end of the sixth resistor R6 connect to an input terminal of the first power supply. After the mainboard 10 works stably, the mainboard 10 outputs an enable signal (BL_EN in the present embodiment) to the enabling switching unit 321, at this time, the first triode Q1 is turned on, making a conduction amount of the first optocoupler OP1 increase, a base of the second diode D2 obtains a voltage difference, before the second diode D2 is turned on in a saturation, and converting the first power supply into the second power supply to the main LLC circuit 3221, followed by the main LLC circuit 3221 starting the main LLC transformer 3222, the main LLC transformer 3222 converts the high-voltage direct current into the third voltage before supplying to the MINI LED screen 20, to light up the MINI LED screen 20.

Further, referring to FIG. 5, the standby switching subunit 311 comprises a third diode D3, a seventh resistor R7, an eighth resistor R8, a ninth resistor R9, a tenth resistor R10, a third triode Q3, a third capacitor C3, and a second optocoupler OP2; an anode of the third diode D3 connects to the mainboard 10, a cathode of the third diode D3 connects to one end of the seventh resistor R7, all of another end of the seventh resistor R7, one end of the eighth resistor R8, and one end of the third capacitor C3 connect to a base of the third triode Q3, an emitter of the third triode Q3, another end of the third capacitor C3, and another end of the eighth resistor R8 are all grounded; a collector of the third triode Q3 connects to a second pin of the second optocoupler OP2, a first pin of the second optocoupler OP2 connects to a first voltage input terminal through the ninth resistor R9, a third pin of the second optocoupler OP2 connects to an Auto_stb signal terminal, and a fourth pin of the second optocoupler OP2 connects to a DVCC_1 signal terminal. After turning on the AC power, the power supply board outputs +10V voltage to power the mainboard 10 through the conversion subunit 3121. The mainboard 10, after working normally, provides an on/off signal to the power supply board, and after the standby switching subunit 311 receives the on/off signal, the third triode Q3 turns on in a saturation, a conduct amount of the second photocoupler OP2 increases, the DVCC_1 signal terminal powers the Auto_stb signal terminal, before waking up from a standby mode, that makes the conversion subunit 3121 exit the standby mode and enter a working state, thereby completing a loop process of the standby mode of the standby subunit.

Further, referring to FIG. 6 and FIG. 7, the step-down subunit 312 comprises a fourth diode D4, an eleventh resistor R11, a twelfth resistor R12, a fourth capacitor C4, a fourth triode Q4, a thirteenth resistor R13, a fourteenth resistor R14, a fifteenth resistor R15, a sixteenth resistor R16, a seventeenth resistor R17, an eighteenth resistor R18, a nineteenth resistor R19, a twentieth resistor R20, a twenty-first resistor R21, a twenty-second resistor R22, a twenty-third resistor R23, a fifth capacitor C5, a sixth capacitor C6, a seventh capacitor C7, an eighth capacitor C8, a ninth capacitor C9, a voltage regulator U1, a third optocoupler OP3, and a second Zener diode ZD2; an anode of the fourth diode D4 connects to the mainboard 10, a cathode of the fourth diode D4 connects to one end of the eleventh resistor R11, all of another end of the eleventh resistor R11, one end of the twelfth resistor R12, and one end of the fourth capacitor C4 connect to a base of the fourth triode Q4, an emitter of the fourth triode Q4, another end of the fourth capacitor C4, and another end of the twelfth resistor R12 are all grounded, a collector of the fourth triode Q4 connects to one end of the thirteenth resistor R13, another end of the thirteenth resistor R13 connects to one end of the fourteenth resistor R14, another end of the fourteenth resistor R14 connects to one end of the fifteenth resistor R15, one end of the seventh capacitor C7, one end of the sixth capacitor C6, one end of the fifth capacitor C5, and one end of the eighteenth resistor R18, all of one end of the seventeenth resistor R17, one end of the eighth capacitor C8, and one end of the twentieth resistor R20 connect to one end of the fifth capacitor C5, a first pin of the voltage regulator U1 connects to one end of the eighteenth resistor R18, another end of the sixth capacitor C6 connects to one end of the twenty-second resistor R22, all of another end of the twenty-second resistor R22, one end of the twenty-third resistor R23, one end of the ninth capacitor C9, another end of the seventh capacitor C7, and a second pin of the voltage regulator U1 connect to a second pin of the third photocoupler OP3, another end of the fifth capacitor C5 connects to one end of the sixteenth resistor R16, another end of the sixteenth resistor R16 and another end of the seventeenth resistor R17 are both connected to power, another end of the eighth capacitor C8 connects to one end of the nineteenth resistor R19, another end of the nineteenth resistor R19, another end of the twentieth resistor R20, and one end of the twenty-first resistor R21 are all connected to power, all of another end of the twenty-first resistor R21, one end of the twenty-third resistor 23, and a first pin of the third optocoupler OP3 connect to an OVP_1 signal terminal, another end of the fifteenth resistor R15, another end of the eighteenth resistor R18, another end of the ninth capacitor R19, and a third pin of the voltage regulator U1 are all grounded, a third pin of the third optocoupler OP3 and an anode of the second Zener diode ZD2 are both grounded, a fourth pin of the third optocoupler OP3 and a cathode of the second Zener diode ZD2 connect to an FB_2 signal terminal. The conversion subunit 3121 enters the working state under a control of the standby switching subunit 311, and at a same time, after receiving the on/off signal, the step-down subunit 312 has the fourth triode Q4 saturated and turned on, the thirteenth resistor R13, the fourteenth resistor R14, and the fifteenth resistor R15 are connected in parallel, making a current flowing through the voltage regulator U1 increase, and a conduction amount of the third optocoupler OP3 increase, before the step-down subunit 312 exits the standby mode, and at a same time a feedback signal is sent to the conversion subunit 3121, then the bridgeless PFC circuit in the conversion subunit 3121 starts to work, an output voltage of 10V becomes 12V, and the conversion subunit 3121 further outputs the first power supply and the high-voltage direct current to the second conversion module 32, so as to light up the MINI LED screen 20.

Further, referring to FIG. 8, the power supply subunit 3122 comprises a fifth diode D5, a sixth diode D6, a third Zener diode ZD3, a twenty-fourth resistor R24, a twenty-fifth resistor R25, a twenty-sixth resistor R26, a twenty-seventh resistor R27, a twenty-eighth resistor R28, a twenty-ninth resistor R29, a thirtieth resistor R30, a tenth capacitor C10, an eleventh capacitor C11, a twelfth capacitor C12, a thirteenth capacitor C13, a fourteen capacitor C14, a fifth triode Q5, a sixth triode Q6, and a seventh triode Q7; another end of the twenty-fourth resistor R24 connects to a collector of the fifth triode Q5, one end of the twenty-fifth resistor R25, and one end of the tenth capacitor C10, another end of the tenth capacitor C10 and a cathode of the fifth diode D5 are grounded, an anode of the fifth diode D5 connects to an anode of the third Zener diode ZD3, all of a cathode of the third Zener diode ZD3, another end of the twenty-fifth resistor R25, and one end of the twenty-sixth resistor R26 connect to a base of the fifth triode Q5, both another end of the twenty-sixth resistor R26 and an emitter of the fifth triode Q5 connect to one end of the twenty-seventh resistor R27, one end of the eleventh capacitor C11, and an emitter of the seventh triode Q7, all of another end of the eleventh capacitor C11, an emitter of the sixth triode Q6, one end of the twenty nineteenth resistor R29, and one end of the twelfth capacitor C12 are grounded, both another end of the twenty-seventh resistor R27 and one end of the twenty-eighth resistor R28 connect to a base of the seventh triode Q7, another end of the twenty-eighth resistor R28 connects to a collector of the sixth triode Q6, all of another end of the twenty-sixth resistor R26, another end of the twelfth capacitor C12, and one end of the thirtieth resistor R30 connect to a base of the sixth triode Q6, a collector of the seventh triode Q7 and one end of the thirteenth capacitor C13 connect to an anode of the sixth diode D6, both a cathode of the sixth diode D6 and one end of the fourteenth capacitor C14 connect to an output terminal of the first power supply, another end of the fourteenth capacitor C14 gets grounded, another end of the thirteenth capacitor C13 gets grounded, another end of the thirtieth resistor R30 connects to the conversion subunit 3121 (connects to a VCC2_CTRL signal terminal in the present embodiment); after the conversion subunit 3121 starts to work, the conversion subunit 3121 controls the VCC2_CTRL signal terminal to be at a high level, turning on the sixth triode Q6 and the seventh triode Q7, further outputting the first power source to the enabling switching unit 321, to provide power for an operation of the enabling switching unit 321.

Figure 9:
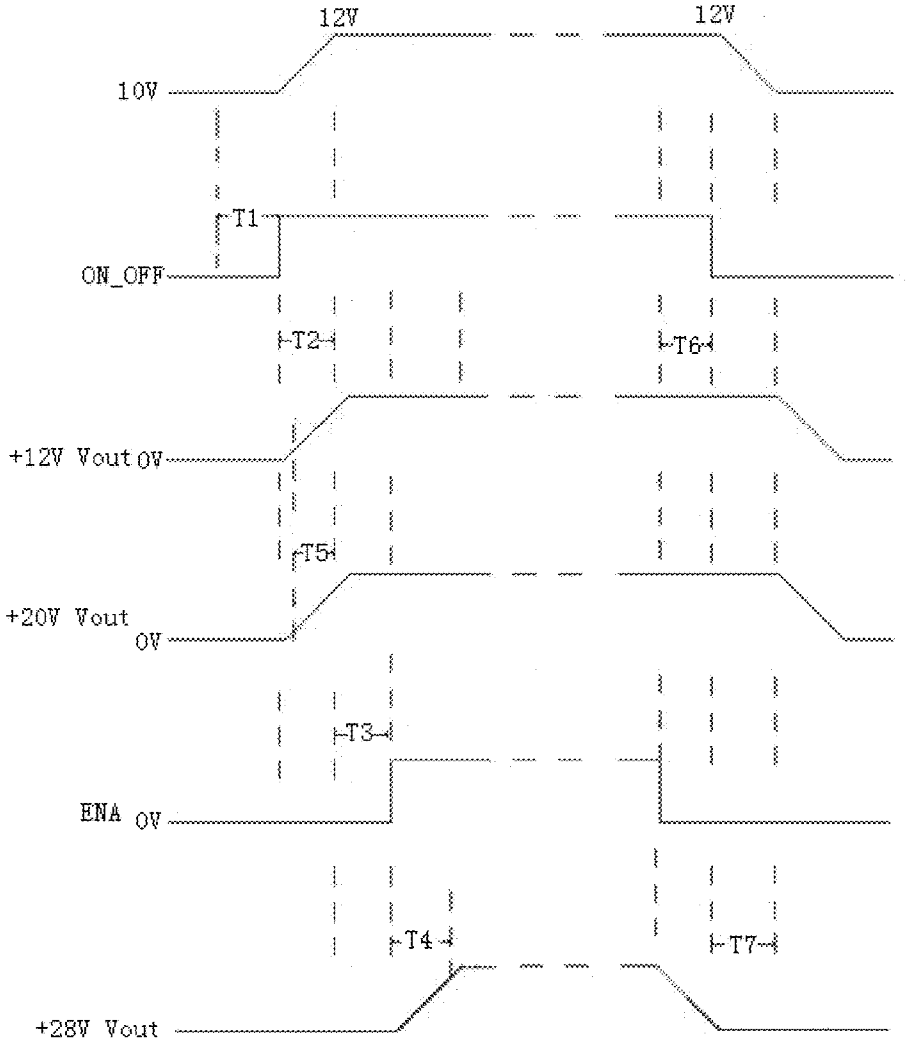
FIG. 9 illustrates a schematic diagram on a switching sequence of the MINI LED driving power supply provided by the present application.

Further, a schematic diagram on a switching sequence of the MINI LED driving power supply provided by the present application is shown in FIG. 9, further detailed description on a start-up process and a standby process of the MINI LED driving power supply provided by the present application is stated below with references to FIGS. 3 to 9:

After turning on an AC power, the power board outputs 10V to power the mainboard 10. After working normally, an ON/OFF signal in a high-level is provided to the power board, turning on the third triode Q3, and the bridgeless PFC starts to work, boosting a voltage having been rectified to a high-voltage direct current at 400V, and outputting a VCC2_CTRL signal at a high level to control the sixth triode Q6 and the seventh triode Q7 to be turned on, a power supply sub-circuit supplies the first power supply to the enabling switching unit 321. At a same time, when the ON/OFF signal for power switching is high, a step-down sub-circuit starts to switch to a normal working mode. After a period of about T1, the output voltage of the first conversion module 31 increases from 10V to 12V and 20V gradually. After a period of T2, the power supply board outputs a +12V voltage stably to supply power to the mainboard 10, and after a period of T5, the 20V voltage output of the power supply board is stable. In order to light up the screen, after an interval of a period about T3, the mainboard 10 sends an ENA signal at a high-level to the power board, and after receiving the ENA signal at the high-level, the enabling switching unit 321 starts to work, converting the first power supply to the second power supply before outputting to the main LLC circuit 3221, then the main LLC circuit 3221 starts the main LLC transformer 3222 to output +28V, before the MINI LED screen 20 is lit up, and reaching a stable output after a period of T4. Thus, there is an interval of at least 36 ms from starting the +12V to starting the +28V.

When the mainboard 10 of the screen receives a standby signal, the mainboard 10 outputs an ENA signal at a low level to the power board, and the enabling switching unit 321 stops working and no longer having the second power supply output, then the power board turns off the +28V output. After another interval of a period of T6, the mainboard 10 pulls the ON/OFF signal down, at this time, the standby switching subunit 311 triggers the bridgeless PFC circuit to stop working and enter a standby state according to the ON/OFF signal at a low level, while a step-down sub-circuit provides a feedback signal according to the ON/OFF signal at the low level, making the output voltage of the conversion subunit 3121 drop from 12V to 10V to power the mainboard 10, which means providing 10V for the mainboard 10 during a standby; and further after a period of T7, the output voltage of 20V stops outputting, and a whole machine enters a standby state, wherein the period of T6 is no less than 30 ms.

The present application, by adopting a transforming and a PFC+LLC integrated control module independently, boosts an AC input voltage to a high-voltage direct current at 400V, the high-voltage direct current is then converted into +12V and +28V independently, and by adjusting a switching sequence of a power supply according to a signal given by the mainboard 10, the +12V and +28V are converted and output independently while controlled by the ON/OFF signal. In addition, since +28V is applied to powering the screen alone, thus another control signal ENA is arranged, and only when the ON/OFF signal and the ENA signal are both turned on at a same time, will the screen be lit up, so as to control the timing sequence of turning on/off the power to match the timing sequence of the MINI LED screen 20. Due to adopting an independent PWM controller and an independent transformer, the +12V and the +28V are independent from each other from a basis. Whether an output and a feedback adjustment circuit of each line is working normally or not, will not affect a working state of another line, thereby a problem of an interference between lines is avoided. Since an output of each line is isolated completely, there will be no effect on an output of one line when a load of another single line changes, ensuring a system work normally and stably. The voltages output from the power source board are independence, making the whole machine work stably and normally, effectively improving an electrical performance of a product, improving a picture quality experience of a MINI LED TV, and prolonging a service life of the screen.

The present application further provides a MINI LED TV correspondingly, which comprises the MINI LED driving power supply stated above. Since the MINI LED driving power supply has been described in details above, no more descriptions in details are stated herein.

All above, the present application provides a MINI LED driving power supply and a MINI LED television, the MINI LED driving power supply comprises a power supply board connecting with a mainboard and a MINI LED screen, the power supply board comprises a first conversion module and a second conversion module; the first conversion module connects to the mainboard and the second conversion module, applied to outputting a power supply voltage to power the mainboard after the first conversion module is turned on, and outputting a first voltage and a second voltage to power the mainboard according to a power-on/off signal output by the mainboard, as well as outputting a first power supply and a high-voltage direct current to the second conversion module; the second conversion module connects to the MINI LED screen, applied to converting the high-voltage direct current into a third voltage before outputting to the MINI LED screen according to an enable signal output by the mainboard and the first power supply, to light up the MINI LED screen. By converting and outputting the first voltage and the third voltage independently, the present application makes that, whether an output of the third voltage works normally or not has no effect on a working state of another line, thus a problem of an interference between a plurality of lines is avoided.

It should be understood that the application of the present application is not limited to the above examples and can be improved or transformed by those skilled in the art based on the above description. All these improvements and transformations should fall within the protection scope of the appended claims of the present application.

What is claimed is:

1. A MINI LED driving power supply, comprising a power supply board connecting with a mainboard and a MINI LED screen, wherein the power supply board comprises a first conversion module and a second conversion module;

the first conversion module is connected to the mainboard and the second conversion module;

the first conversion module is configured to output a power supply voltage to power the mainboard after the first conversion module is powered on, and output a first voltage and a second voltage to power the mainboard according to a power-on/off signal output by the mainboard, as well as output a first power supply and a high-voltage direct current to the second conversion module;

the second conversion module is connected to the MINI LED screen; and the second conversion module is configured to convert the high-voltage direct current into a third voltage and output the third voltage to the MINI LED screen according to an enable signal output by the mainboard and the first power supply, to light up the MINI LED screen, wherein the second conversion module comprises an enabling switching unit and a second conversion unit;

the enabling switching unit is connected to the first converting unit and the second converting unit, respectively;

the enabling switching unit is configured to convert the first power supply into a second power supply and output the second power supply to the second conversion unit according to the enable signal output by the mainboard;

the second conversion unit is connected to the MINI LED screen; and the second conversion unit is configured to convert the high-voltage direct current into the third voltage to power the MINI LED screen according to the second power supply.

2. The MINI LED driving power supply of claim 1, wherein the second conversion unit comprises a main LLC circuit and a main LLC transformer;

the main LLC circuit is connected to the enabling switching unit and the main LLC transformer, respectively;

the main LLC circuit is configured to start the main LLC transformer according to the second power supply;

the main LLC transformer is connected to the MINI LED screen; and the main LLC transformer is configured to convert the high-voltage direct current into the third voltage and output the third voltage to the MINI LED screen.

3. The MINI LED driving power supply of claim 1, wherein the enabling switching unit comprises a first diode, a second diode, a first resistor, a second resistor, a third resistor, a fourth resistor, a fifth resistor, a sixth resistor, a first triode, a second triode, a first capacitor, a second capacitor, a first Zener diode, and a first optocoupler;

an anode of the first diode is connected to an enable signal input terminal, a cathode of the first diode is connected to the first resistor;

an anode of the second diode is connected to an LED_ON signal terminal, a cathode of the second diode is connected to the first resistor;

one end of the first resistor is connected to the first diode and the second diode, another end of the first resistor is connected to the first triode;

one end of the second resistor is connected to the first triode, another end of the second resistor is grounded;

one end of the first capacitor is connected to the first triode, another end of the first capacitor is grounded;

a first pin of the first optocoupler is connected to a first voltage input terminal through the third resistor, a second pin of the first optocoupler is connected to the first triode, a third pin of the first optocoupler is connected to the fourth resistor, and a fourth pin of the first optocoupler is connected to an input terminal of the first power supply;

one end of the fourth resistor is connected to the first optocoupler, another end of the fourth resistor is connected to the fifth resistor;

one end of the fifth resistor is connected to the fourth resistor, another end of the fifth resistor is grounded;

an anode of the first Zener diode is grounded, a cathode of the first Zener diode is connected to the fourth resistor;

a base of the first triode is connected to the first resistor, the second resistor, and the first capacitor, a collector of the first triode is connected to the first optocoupler, and an emitter of the first triode is grounded;

a base of the second triode is connected to the fourth resistor, a collector of the second triode is connected to the input terminal of the first power supply, and an emitter of the second triode is connected to an output terminal of the second power supply;

one end of the second capacitor is connected to the output terminal of the second power supply, another end of the second capacitor is grounded; and one end of the sixth resistor is connected to the output terminal of the second power supply, another end of the sixth resistor is connected to the input terminal of the first power supply.

4. The MINI LED driving power supply of claim 1, further comprising a standby switching subunit that comprises a third diode, a seventh resistor, an eighth resistor, a ninth resistor, a tenth resistor, a third triode, a third capacitor, and a second optocoupler;

an anode of the third diode is connected to the mainboard, a cathode of the third diode is connected to the seventh resistor;

one end of the seventh resistor is connected to the third diode, another end of the seventh resistor is connected to the third triode;

one end of the eighth resistor is connected to the third triode, another end of the eighth resistor is grounded;

one end of the third capacitor is connected to the third triode, another end of the third capacitor is grounded;

a base of the third triode is connected to the seventh resistor, the eighth resistor, and the third capacitor, a collector of the third triode is connected to the second optocoupler, and an emitter of the third triode is grounded; and a first pin of the second optocoupler is connected to a first voltage input terminal through the ninth resistor, a second pin of the second optocoupler is connected to the third triode, a third pin of the second optocoupler is connected to an Auto_stb signal terminal, and a fourth pin of the second optocoupler is connected to a DVCC_1 signal terminal.

5. The MINI LED driving power supply of claim 1, wherein further comprising a step-down subunit that comprises a fourth diode, an eleventh resistor, a twelfth resistor, a fourth capacitor, a fourth triode, a thirteenth resistor, a fourteenth resistor, a fifteenth resistor, a sixteenth resistor, a seventeenth resistor, an eighteenth resistor, a nineteenth resistor, a twentieth resistor, a twenty-first resistor, a twenty-second resistor, a twenty-third resistor, a fifth capacitor, a sixth capacitor, a seventh capacitor, an eighth capacitor, a ninth capacitor, a voltage regulator, a third optocoupler, and a second Zener diode;

an anode of the fourth diode is connected to the mainboard, a cathode of the fourth diode is connected to the eleventh resistor;

one end of the eleventh resistor is connected to the fourth diode, another end of the eleventh resistor is connected to the fourth triode;

one end of the twelfth resistor is connected to the fourth triode, another end of the twelfth resistor is grounded;

one end of the fourth capacitor is connected to the fourth triode, another end of the fourth capacitor is grounded;

a base of the fourth triode is connected to the eleventh resistor, the twelfth resistor, and the fourth capacitor, a collector of the fourth diode is connected to the thirteenth resistor, and an emitter of the fourth triode is grounded;

one end of the thirteenth resistor is connected to the fourth triode, another end of the thirteenth resistor is connected to the fourteenth resistor;

one end of the fourteenth resistor is connected to the thirteenth resistor, another end of the fourteenth resistor is connected to the fifteenth resistor, the fifth capacitor, the sixth capacitor, the seventh capacitor, and the eighteenth resistor;

one end of the fifteenth resistor is connected to the fourteenth resistor, another end of the fifteenth resistor is grounded;

one end of the sixteenth resistor is connected to the fifth capacitor, another end of the sixteenth resistor is connected to power;

one end of the seventeenth resistor is connected to the fifth capacitor, another end of the seventeenth resistor is connected to power;

one end of the eighteenth resistor is connected to the fourteenth resistor and the voltage regulator, another end of the eighteenth resistor is grounded;

one end of the nineteenth resistor is connected to the eighth capacitor, another end of the nineteenth resistor is connected to power;

one end of the twentieth resistor is connected to the fifth capacitor, another end of the twentieth resistor is connected to power;

one end of the twenty-first resistor is connected to power, another end of the twenty-first resistor is connected to an OVP_1 signal terminal;

one end of the twenty-second resistor is connected to the sixth capacitor, another end of the twenty-second resistor is connected to the third optocoupler;

one end of the twenty-third resistor is connected to the third optocoupler, another end of the twenty-third resistor is connected to the OVP_1 signal terminal;

one end of the fifth capacitor is connected to the fourteenth resistor, the seventeenth resistor, the twentieth resistor, and the eighth capacitor, another end of the fifth capacitor is connected to the sixteenth resistor;

one end of the sixth capacitor is connected to the fourteenth resistor, another end of the sixth capacitor is connected to the twenty-second resistor;

one end of the seventh capacitor is connected to the fourteenth resistor, another end of the seventh capacitor is connected to the third optocoupler;

one end of the eighth capacitor is connected to the fifth capacitor, another end of the eighth capacitor is connected to the nineteenth resistor;

one end of the nineth capacitor is connected to the third optocoupler, another end of the nineth capacitor is grounded;

a first pin of the voltage regulator is connected to the eighteenth resistor, a second pin of the voltage regulator is connected to the third optocoupler, and a third pin of the voltage regulator is grounded;

a first pin of the third optocoupler is connected to the OVP_1 signal terminal, a second pin of the third optocoupler is connected to the twenty-second resistor, the twenty-third resistor, the seventh capacitor, the nineth capacitor, and the voltage regulator, a third pin of the third optocoupler is grounded, and a fourth pin of the third optocoupler is connected to an FB_2 signal terminal; and an anode of the second Zener diode is grounded, a cathode of the second Zener diode is connected to the FB_2 signal terminal.

6. The MINI LED driving power supply of claim 1, wherein further comprising a conversion subunit that comprises a bridgeless PFC circuit, an auxiliary LLC circuit, and an auxiliary LLC transformer integrated in a same semiconductor chip package, the bridgeless PFC circuit outputs a high-voltage direct current to the auxiliary LLC circuit after the bridgeless PFC circuit is started, and after the auxiliary LLC circuit controls the LLC transformer to start, the auxiliary LLC transformer converts the high-voltage direct current into the first voltage and the second voltage to supply power to the mainboard.

7. The MINI LED driving power supply of claim 6, wherein the bridgeless PFC circuit further outputs the high-voltage direct current to the second conversion module, and the main LLC transformer in the second conversion module outputs the third voltage to power the MINI LED screen.

8. The MINI LED driving power supply of claim 6, wherein a type of semiconductor chip in the semiconductor chip package is U_MD6751.

9. The MINI LED driving power supply of claim 1, further comprising a power supply subunit comprises a fifth diode, a sixth diode, a third Zener diode, a twenty-fourth resistor, a twenty-fifth resistor, a twenty-sixth resistor, a twenty-seventh resistor, a twenty-eighth resistor, a twenty-ninth resistor, a thirtieth resistor, a tenth capacitor, an eleventh capacitor, a twelfth capacitor, a thirteenth capacitor, a fourteen capacitor, a fifth triode, a sixth triode, and a seventh triode;

an anode of the fifth diode is connected to the third Zener diode, a cathode of the fifth diode is grounded;

an anode of the sixth diode is connected to the seventh triode and the thirteenth capacitor, a cathode of the sixth diode is connected to the output terminal of the first power supply;

an anode of the third Zener diode is connected to the fifth diode, a cathode of the third Zener diode is connected to the fifth triode;

one end of the twenty-fourth resistor is connected to the fifth triode, the twenty-fifth resistor, and the tenth capacitor;

one end of the twenty-fifth resistor is connected to the tenth capacitor, another end of the twenty-fifth resistor is connected to the fifth triode;

one end of the twenty-sixth resistor is connected to the fifth triode, another end of the twenty-sixth resistor is connected to the twenty-seventh resistor, the eleventh capacitor, and the seventh triode;

one end of the twenty-seventh resistor is connected to the twenty-sixth resistor and the fifth triode, another end of the twenty-seventh resistor is connected to the seventh triode;

one end of the twenty-eighth resistor is connected to the seventh triode, another end of the twenty-eighth resistor is connected to the sixth triode;

one end of the twenty-nineth resistor is grounded, another end of the twenty-nineth resistor is connected to the sixth triode;

one end of the thirtieth resistor is connected to the sixth triode, another end of the thirtieth resistor is connected to the conversion subunit;

one end of the tenth capacitor is connected to the twenty-fourth resistor, another end of the tenth capacitor is grounded;

one end of the eleventh capacitor is connected to the twenty-sixth resistor and the seventh triode, another end of the eleventh capacitor is grounded;

one end of the twelfth capacitor is grounded, another end of the twelfth capacitor is connected to the sixth triode;

one end of the thirteenth capacitor is connected to the sixth diode, another end of the thirteenth capacitor is grounded;

one end of the fourteenth capacitor is connected to the output terminal of the first power supply, another end of the fourteenth capacitor is grounded;

a base of the fifth triode is connected to the third Zener diode, the twenty-fifth resistor, and the twenty-sixth resistor, a collector of the fifth triode is connected to the twenty-fourth resistor, and an emitter of the fifth triode is connected to the twenty-seventh resistor, the eleventh capacitor, and the seventh triode;

a base of the sixth triode is connected to the twenty-sixth resistor, the thirtieth resistor, and the twelfth capacitor, a collector of the sixth triode is connected to the twenty-eighth resistor, and an emitter of the sixth triode is grounded; and a base of the seventh triode is connected to the twenty-seventh resistor and the twenty-eighth resistor, a collector of the seventh triode is connected to the sixth diode, and an emitter of the seventh triode is connected to the twenty-sixth resistor and the fifth triode.

10. The MINI LED driving power supply of claim 9, wherein another end of the thirtieth resistor is connected to a VCC2_CTRL signal terminal, after the conversion subunit starts to work, the conversion subunit controls the VCC2_CTRL signal terminal to be at a high level, to turn on the sixth triode and the seventh triode, further outputs the first power source to the enabling switching unit, to provide power for an operation of the enabling switching unit.

11. A MINI LED television, comprising the MINI LED driving power supply according to claim 1.

* * * * *